No. 752,299. PATENTED FEB. 16, 1904.
P. PLANTINGA.
MEANS FOR CONTROLLING THE FLOW OF GASES.
APPLICATION FILED MAY 2, 1903.
NO MODEL. 5 SHEETS—SHEET 1.
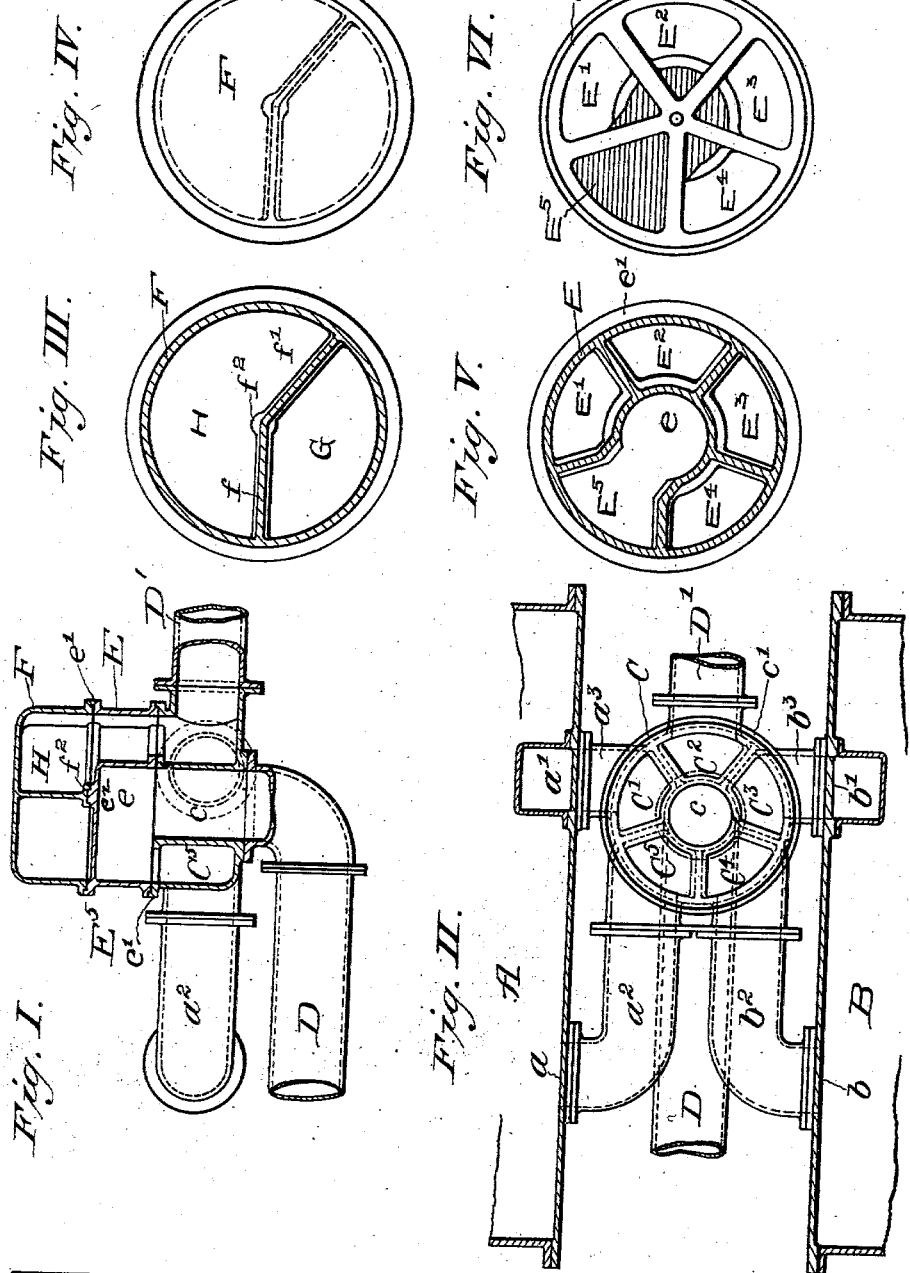

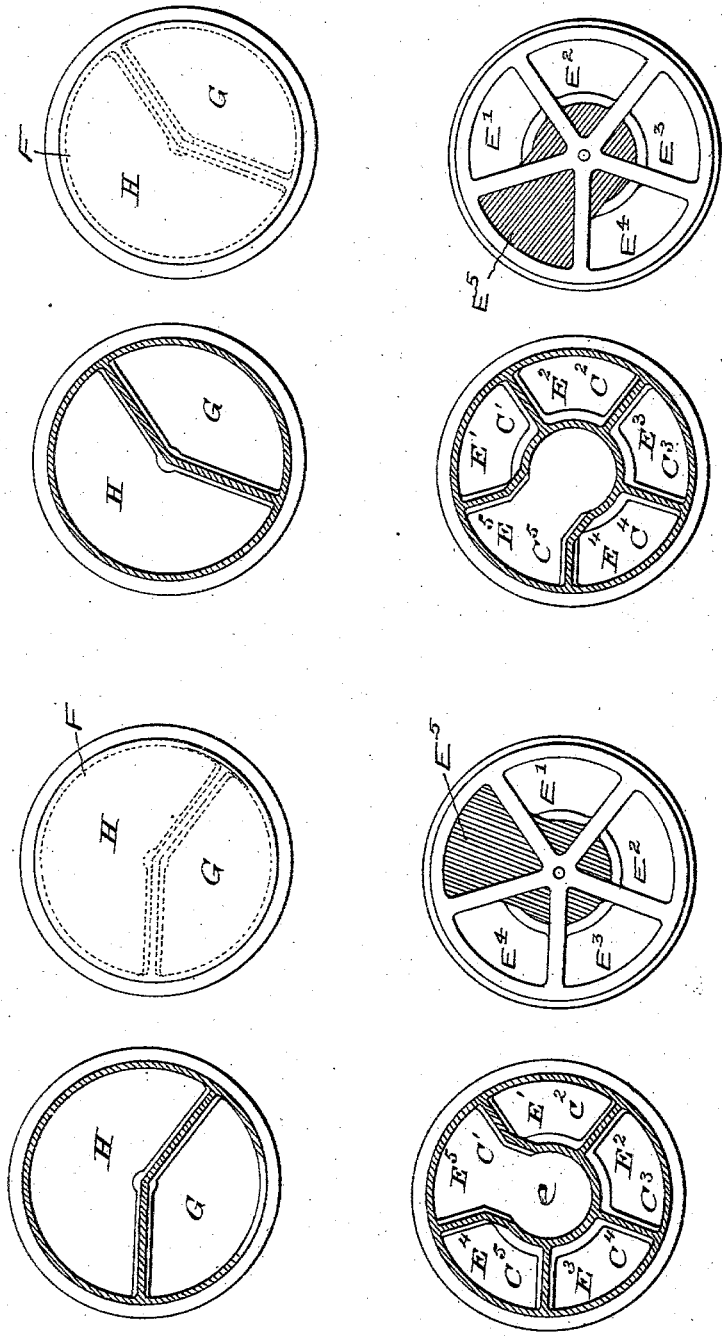

No. 752,299. PATENTED FEB. 16, 1904.
P. PLANTINGA.
MEANS FOR CONTROLLING THE FLOW OF GASES.
APPLICATION FILED MAY 2, 1903.
NO MODEL. 5 SHEETS—SHEET 3.
*Fig. X.*
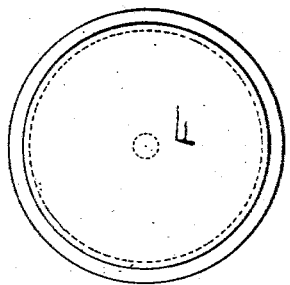
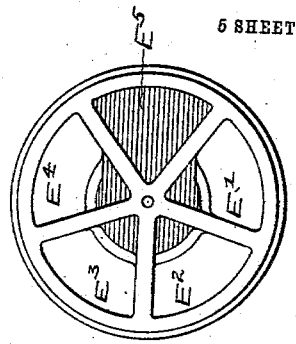
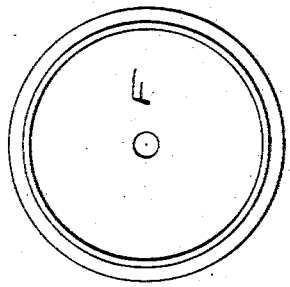
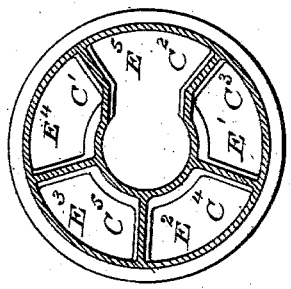
*Fig. IX.*
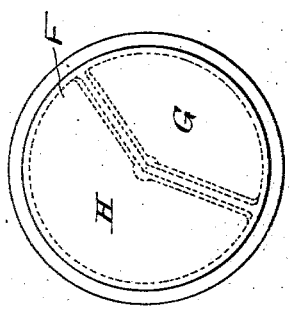
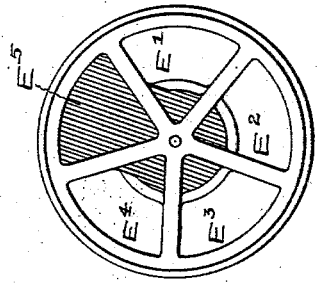
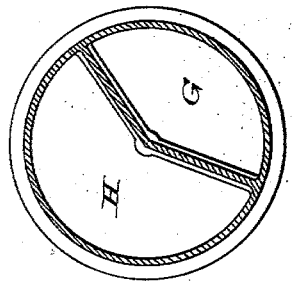
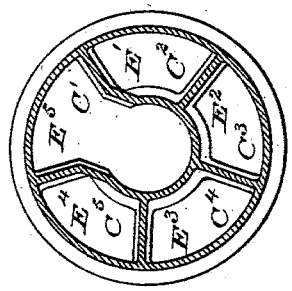
WITNESSES:
D. T. Davies
G. W. Saywell
INVENTOR:
P. Plantinga
by his attorney
J. B. Fay No. 752,299. PATENTED FEB. 16, 1904.
P. PLANTINGA.
MEANS FOR CONTROLLING THE FLOW OF GASES.
APPLICATION FILED MAY 2, 1903.
NO MODEL. 5 SHEETS—SHEET 4.
*Fig. XII.*
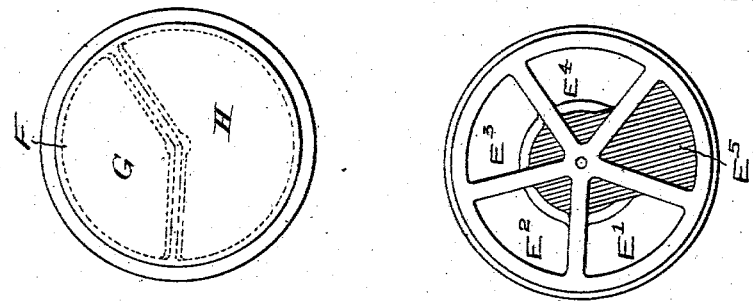
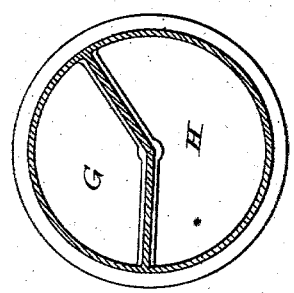
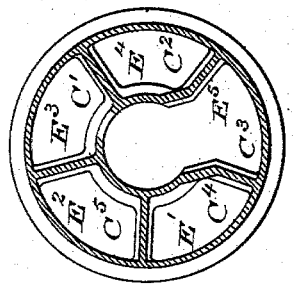
*Fig. XI.*
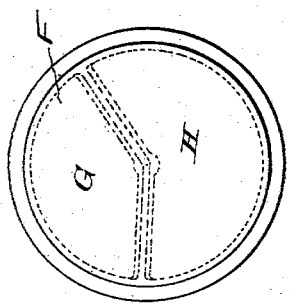
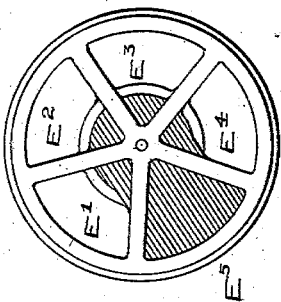
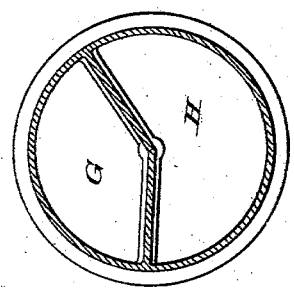
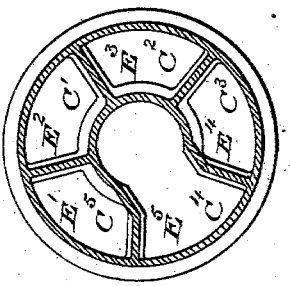
WITNESSES:
D. G. Davies
G. W. Saywell
INVENTOR:
P. Plantinga,
by his attorney
J. B. Jay.

No. 752,299. PATENTED FEB. 16, 1904.
P. PLANTINGA.
MEANS FOR CONTROLLING THE FLOW OF GASES.
APPLICATION FILED MAY 2, 1903.
NO MODEL. 5 SHEETS—SHEET 5.
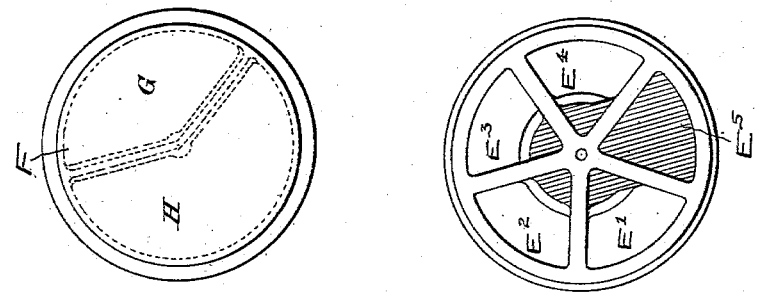
*Fig. XIV.*
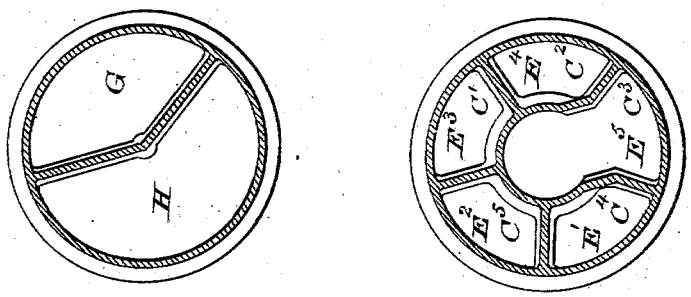
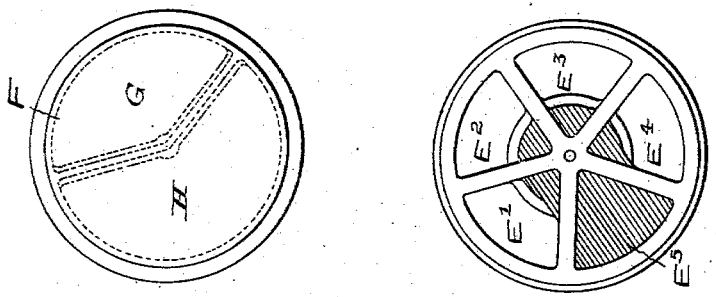
*Fig. XIII.*
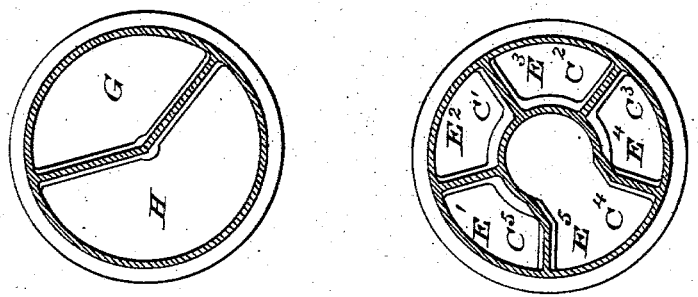
WITNESSES:
D. T. Davies
G. W. Saywell
INVENTOR:
P. Plantinga,
by his attorney
J. B. Fay No. 752,299. Patented February 16, 1904.

UNITED STATES PATENT OFFICE.

PIERRE PLANTINGA, OF CLEVELAND, OHIO.

MEANS FOR CONTROLLING THE FLOW OF GASES.

SPECIFICATION forming part of Letters Patent No. 752,299, dated February 16, 1904.

Application filed May 2, 1903. Serial No. 155,240. (No model.)

*To all whom it may concern:*

Be it known that I, PIERRE PLANTINGA, a citizen of the United States, and a resident of Cleveland, county of Cuyahoga, and State of Ohio, have invented a new and useful Improvement in Means for Controlling the Flow of Gases, of which the following is a specification, the principle of the invention being herein explained and the best mode in which I have contemplated applying that principle, so as to distinguish it from other inventions.

My invention relates to means for controlling the flow of gases, and is particularly applicable for use in the purifying apparatus of illuminating-gas plants. As so particularly applied such means are commonly called "center valves."

The object of the invention is to produce means whereby the gas may be caused to flow in either of two directions through each of two purifying-compartments, through both in the same or through one in the direct and through the other in the reverse direction, or may be caused to by-pass both compartments simultaneously.

Said invention consists of means hereinafter fully described, and particularly set forth in the claims.

The annexed drawings and the following description set forth in detail certain mechanism embodying the invention, such disclosed means constituting but one of various mechanical forms in which the principle of the invention may be used.

In said annexed drawings, Figure I represents a vertical axial section of a center valve with supply, discharge, and auxiliary pipes attached and shown broken and partly in section. Fig. II represents a plan view of the valve with the upper and lower caps removed, showing a portion of the two connected purifying-compartments in horizontal section. Figs. III and IV represent a horizontal section and a plan view, respectively, of the upper cap.
Figs. V and VI represent a horizontal section and a plan view, respectively, of the lower cap, showing the position of said cap for a given direction of flow of the gas. Fig. VII represents a group of views similar to those shown in Figs. III, IV, V, and VI, showing the relative positions of such two caps for a second direction of flow of said gas; and Figs. VIII to XIV, inclusive, illustrate such relative position for other different directions of flow.

The two purifiers A and B are substantially identical in construction, contain the purifying medium, and are each provided with a gas-inlet $a$ and $b$ and a gas-outlet $a'$ and $b'$, through which gas may enter and depart. Inlet-pipes $a^2$ and $b^2$ and outlet-pipes $a^3$ and $b^3$ are connected with the inlets and outlets $a$, $a'$, $b$, and $b'$, respectively, as shown in Fig. II. These pipes $a^2$, $b^2$, $a^3$, and $b^3$, all have their other ends secured to a distributing-section C of the center valve, which is formed with a central upright duct $c$, open top and bottom, and five surrounding chambers $C'$, $C^2$, $C^3$, $C^4$, and $C^5$ by means of radial partitions, as shown in Fig. II. These chambers are all open at the top and closed at the bottom, as shown. Chambers $C^4$ and $C^5$ each have a lateral opening, to which are connected elbows, to which are connected, respectively, the pipes $b^2$ and $a^2$. Chambers $C'$ and $C^3$ similarly connect with pipes $a^3$ and $b^3$. To the bottom of the duct $c$ is secured an elbow, to which is secured a gas-supply pipe D. Chamber $C^2$ is laterally connected with a gas-discharge pipe $D'$. It will therefore be seen that there are formed six gas-ducts by means of these pipes, elbows, and chambers, the extremities of which are placed in juxtaposition and terminate in the plane of the top of the distributing-section C. The outer wall of such section is made cylindrical, and its upper periphery is formed with a flange $c'$, forming a bearing for a cap E, which I shall designate as the "lower" cap. This cap is cylindrical in form, of a diameter substantially equal to that of the distributing-section C, and divided into five chambers $E'$, $E^2$, $E^3$, $E^4$, and $E^5$ by means of radial partitions, as shown, around central duct $e$, which is coaxial with the duct $c$. Chamber $E^5$ is covered and opens into the duct $e$, which is also covered, the remaining chambers being open top and bottom. The upper periphery of cap E is formed with a flange $e'$, which forms a bearing for cap F, which I shall designate as the "upper" cap. This cap is divided into two chambers H and G by means of two partitions $f$ and $f'$, placed at an angle of one hundred and forty-four degrees relatively to each other. The top of cap F is covered, and the bottom thereof lies substantially flush with the bottom of partitions $f$ and $f'$. At the junction of the latter is formed a bearing $f^2$, which engages a centering-pilot $e^2$, formed upon the top of and coaxial with cap E. The partitions in cap E also lie flush with the bottom of the cap, as do they also with the top thereof. It will therefore be seen that by rotating the two caps E and F various combinations of connections may be formed, the chambers $C'$ $C^2$, &c., $E'$ $E^2$, &c., and G and H forming when superposed segregated duct-sections, as will be understood from the foregoing description.

I shall now describe various positions of the upper caps for effecting varying paths of flow of the gas. The relative positions of said caps being as illustrated in Figs. III, IV, V, and VI, it will be noted that chambers $E'$, $E^2$, $E^3$, $E^4$, and $E^5$ and chambers $C'$, $C^2$, $C^3$, $C^4$, and $C^5$, respectively, are superimposed, and chamber H of cap F connects chambers $E'$ and $E^2$. The gas passing from the source of supply through pipe D flows into duct $c$, thence into duct $e$, chamber $E^5$, (chamber $E^4$ and hence pipe $b^2$ being cut off,) chamber $C^5$, through pipe $a^2$ into the purifying-compartment A, through opening $a'$ into pipe $a^3$, into chamber $E'$, chamber H, across and into chamber $E^2$, chamber $C^2$ and thence into pipe $D'$, from whence it is discharged. The gas thus passes directly through but one purifying-compartment, A, and is cut off from communication with the other compartment, B.

When it is desired to reverse the above-described direction, the caps are placed as illustrated in the group of figures marked VII. In this case the gas enters, as before, through pipe D into duct $c$, duct $e$, chamber $E^5$, and then chamber $C'$, pipe $a^3$, compartment A, through opening $a$, pipe $a^2$, into chamber $C^5$, chamber $E^4$, chamber H, chamber $E'$, chamber $C^2$, and thence into pipe $D'$, thus reversing the direction of flow through the compartment A.

To pass the gas through both chambers simultaneously and directly—that is, into openings $a$ and $b$ and out of openings $a'$ and $b'$—the two caps are placed relatively to each other, as shown in the group of figures marked VIII. The gas now passes from chamber $E^5$ into $C^5$, through pipe $a^2$, through compartment A, out of opening $a'$, through pipe $a^3$ into chamber $C'$, up into chamber $E'$, into chamber H, across and into chamber $E^4$, down into chamber $C^4$, through pipe $b^2$ into and through compartment B, out through opening $b$, through pipe $b^3$ into chamber $C^3$, up into chamber $E^3$, into chamber G, across and into chamber $E^2$, down into chamber $C^2$, and so out through pipe $D'$.

To pass the gas directly through compartment A and in the reverse direction through compartment B, the caps are placed as illustrated in the group of figures numbered IX. In this case the gas passes reversely through the compartment A, as previously described, but upon returning to the distributing-section E passes up through chambers $C^5$ $E^4$ into chamber H, across into chamber $E^3$, chamber $C^4$, thence into pipe $b^2$, and so directly through compartment B, out of opening $b'$ into pipe $b^3$, up through chambers $C^3$ $E^2$ into chamber G, and so across to chambers $E'$ $C^2$, and so out through pipe $D'$.

To by-pass both compartments, cap E is placed as illustrated in the group of figures numbered X, by means of which latter it will be seen that the gas passes directly from ducts $c$ and $e$ into chambers $E^5$ and $C^2$, and so out, all other ducts being closed to its passage. The position of the cap F is in this case obviously immaterial.

To pass the gas through compartment B directly to the exclusion of compartment A, the caps are placed as illustrated in the group of figures numbered XI. The gas passes from ducts $c$ and $e$ into chambers $E^5$ $C^4$, pipe $b^2$, compartment B, pipe $b^3$, chambers $C^3$ $E^4$ H $E^3$ $C^2$, and out through pipe $D'$.

To pass the gas through the compartment B in the reverse direction to the exclusion of compartment A, the caps are placed as illustrated in the group of figures numbered XII. In this case the gas passes through ducts $c$ and $e$, chambers $E^5$ $C^3$, pipe $b^3$, compartment B, pipe $b^2$, chambers $C^4$ $E'$ H $E^4$ $C^2$, and thence out.

To pass the gas through chambers B and A directly, the caps are placed as shown in the group of figures numbered XIII. In this case the gas passes through ducts $c$ and $e$, chambers $E^5$ $C^4$, pipe $b^2$, compartment B, pipe $b^3$, chambers $C^3$ $E^4$ H $E'$ $C^5$, pipe $a^2$, compartment A, pipe $a^3$, chambers $C'$ $E^2$ G $E^3$ $C^2$, and thence out.

To pass the gas through compartment B in the reverse direction and then through compartment A directly, the caps are placed as shown in the group of figures numbered XIV. In this case the gas passes through ducts $c$ and $e$, chambers $E^5$ $C^3$, pipe $b^3$, compartment B, pipe $b'$, chambers $C^4$ $E'$ H $E^2$ $C^5$, pipe $a^2$, compartment A, pipe $a^3$, chambers $C'$ $E^3$ $E^4$ $C^2$, and thence out.

It is obvious that the direction of the gas in the supply and discharge pipes D and $D'$ may be reversed—that is, the gas supply may be taken through pipe $D'$ and the gas discharged through pipe D—in which event any one of the above-described paths of movement may be obtained reversed.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. The combination of a purifying-compartment, a center valve including a distributing-section, supply and discharge ducts connected with said section, and inlet and outlet ducts connecting said compartments with said section, and means embodied in said valve arranged to connect said supply-duct with either the inlet or outlet ducts, whereby the direction of flow of fluid through said compartment may be reversed, said means arranged to connect said supply and discharge ducts and simultaneously cut off communication between said inlet and outlet ducts.

2. The combination of two purifying-compartments, a center valve including a distributing-section, a supply and a discharge duct connected with said section, inlet and outlet ducts connecting each of said compartments with said section, and means embodied in said valve arranged to connect said supply-duct with either the inlet or outlet duct of one of said compartments, and at the same time cut off communication between the other compartment and said supply-duct, said means arranged to connect said supply and discharge ducts and simultaneously cut off communication between said inlet and outlet ducts.

3. The combination of two purifying-compartments, a center valve including a distributing-section, a supply and a discharge duct connected with said section, inlet and outlet ducts connecting each of said compartments with said section, and means embodied in said valve arranged to connect said supply-duct with either the inlet or outlet duct of either of said compartments, said means arranged to connect said supply and discharge ducts and simultaneously cut off communication between said inlet and outlet ducts.

4. The combination of two purifying-compartments, a center valve including a distributing-section, a supply and a discharge duct connected with said section, inlet and outlet ducts connecting each of said compartments with said section, and means embodied in said valve arranged to connect said supply-duct with the inlet-duct of one compartment and such compartment, the outlet-duct of the latter with the inlet duct of the other compartment, and the outlet-duct of the latter with the discharge-duct, said means arranged to connect said supply and discharge ducts and simultaneously cut off communication between said inlet and outlet ducts.

5. In means for controlling the flow of gases, the combination of a supply-duct, a discharge-duct and four auxiliary ducts, the extremities of all said ducts being juxtaposed, means for connecting said supply-duct to any one of the remaining five to the exclusion of the remaining four, and means for connecting two or more of such remaining four with each other.

6. In means for controlling the flow of gases, the combination of a supply-duct, a discharge-duct and four auxiliary ducts, the extremities of all such ducts being juxtaposed, a movable member arranged to establish direct communication between any one of such auxiliary ducts and said supply-duct, to the exclusion of the remainder thereof, and a second movable member arranged to establish direct communication between any one of said auxiliary ducts and said discharge-duct to the exclusion of a portion of the remainder thereof.

7. In means for controlling the flow of gases, the combination of a supply-duct, a discharge-duct and four auxiliary ducts, the extremities of such ducts being juxtaposed, a movable member arranged to establish direct communication between any one of such auxiliary ducts and said supply-duct, and a second movable member arranged to establish direct communication between any one of said auxiliary ducts and said discharge-duct, said movable members being superimposed.

8. In means for controlling the flow of gases, the combination of a centrally-located supply-duct, a discharge-duct and four auxiliary ducts, the extremities of such ducts being juxtaposed, and terminating in substantially the same plane, a rotatable member divided into five compartments, four of which are open at top and bottom and the fifth of which is closed at the top, and a rotatable covered cap surmounting said member and divided into two independent compartments the length of one of which is to the length of the other as two is to five.

Signed by me this 20th day of April, 1903.

PIERRE PLANTINGA.

Attest:
A. E. MERKEL,
G. W. SAYWELL.